(12) United States Patent
Parrish

(10) Patent No.: US 6,445,376 B2
(45) Date of Patent: Sep. 3, 2002

(54) ALTERNATIVE POWER FOR A PORTABLE COMPUTER VIA SOLAR CELLS

(76) Inventor: Sean T. Parrish, 6943 N. Fairfax Ave., Boise, ID (US) 83703

( * ) Notice: Subject to any disclaimer, the term of this patent is extended or adjusted under 35 U.S.C. 154(b) by 0 days.

This patent is subject to a terminal disclaimer.

(21) Appl. No.: 09/932,743

(22) Filed: Aug. 17, 2001

Related U.S. Application Data

(63) Continuation of application No. 08/928,888, filed on Sep. 12, 1997, now Pat. No. 6,300,944.

(51) Int. Cl.[7] .................................................. G09G 5/00
(52) U.S. Cl. ....................................... 345/156; 345/211
(58) Field of Search ................................ 345/211, 102, 345/156, 157, 158; 320/101; 136/243, 252

(56) References Cited

U.S. PATENT DOCUMENTS

| 4,083,097 A | 4/1978 | Anagnostou et al. ......... 29/572 |
|---|---|---|
| 4,563,727 A | 1/1986 | Curiel |
| 4,686,441 A | 8/1987 | Petterson |
| 4,855,725 A | 8/1989 | Fernandez .................. 340/706 |
| 5,039,928 A | 8/1991 | Nishi et al. |
| 5,260,885 A | 11/1993 | Ma |
| 5,300,874 A | 4/1994 | Shimamoto et al. |
| 5,477,239 A | 12/1995 | Busch et al. ................ 345/102 |
| 5,522,943 A | 6/1996 | Spencer et al. |
| 5,532,524 A | 7/1996 | Townsley et al. |
| 5,698,964 A | 12/1997 | Kates et al. ................ 364/707 |
| 5,742,367 A | 4/1998 | Kozaki ........................ 349/64 |
| 5,936,380 A | 8/1999 | Parrish ....................... 320/101 |

*Primary Examiner*—Richard Hjerpe
*Assistant Examiner*—Ronald Laneau
(74) *Attorney, Agent, or Firm*—Knobbe, Martens, Olson & Bear LLP

(57) ABSTRACT

A system for prolonging the operational life of a battery-powered laptop or notebook computer. Solar cells are incorporated into the chassis or display screen of a notebook computer so that the solar cells can provide power to any component of the notebook computer and/or help with the charging, powering, and/or regulation of a battery used as a power source. In one embodiment, solar cells are mounted near the light source so that unused light energy from the light source can be captured.

29 Claims, 8 Drawing Sheets

ALTERNATIVE POWER FOR A PORTABLE COMPUTER VIA SOLAR CELLS

RELATED APPLICATIONS

This application is a continuation of U.S. application Ser. No. 08/928,888, filed Sep. 12, 1997, now U.S. Pat. No. 6,300,944, entitled "ALTERNATIVE POWER FOR A PORTABLE COMPUTER VIA SOLAR CELLS"

FIELD OF THE INVENTION

The present invention relates generally to the use of power from solar cells in connection with laptop, portable, and/or notebook computers. More particularly, the present invention relates to the manner in which solar cells can be used effectively in the electrical power system of such a computer.

BACKGROUND AND SUMMARY OF THE DISCLOSURE

Over the past ten years, notebook computers have become very advanced, widely accepted, and a significant convenience for mobile people. Currently, the primary source of power for such computers is a rechargeable battery, which is recharged periodically by plugging the computer into an outlet or other external power source. And as is well known in the art, many types of batteries have been used (e.g., Ni-Cd, Mi-MH, and Li-ion). Modem batteries of this sort generally have a life expectancy of anywhere between two to four hours of computer use for a given charge. Modern notebook computers are useful, but the limitations on battery life nevertheless significantly limit the usefulness of a notebook computer in an environment where frequent charging is not feasible.

The present invention seeks to remedy these deficiencies by incorporating solar cells into a portable computer to provide an alternate, supplemental source of power. In one embodiment of the present invention, solar cells are incorporated into the display screen assembly of a notebook computer in an unobtrusive and efficient manner. With such a configuration, the notebook computer maintains its portability and functionality, while lengthening the amount of time that the notebook computer can be used without being charged.

The solar cells provide an alternative source of power to help with the charging and powering of the power source in a portable computer.

The advantages and features of the invention may become apparent and the nature of the invention may be more clearly understood by reference to the following detailed description of the invention, the appended claims, and to the several drawings herein.

DETAILED DESCRIPTION

Figure 1:
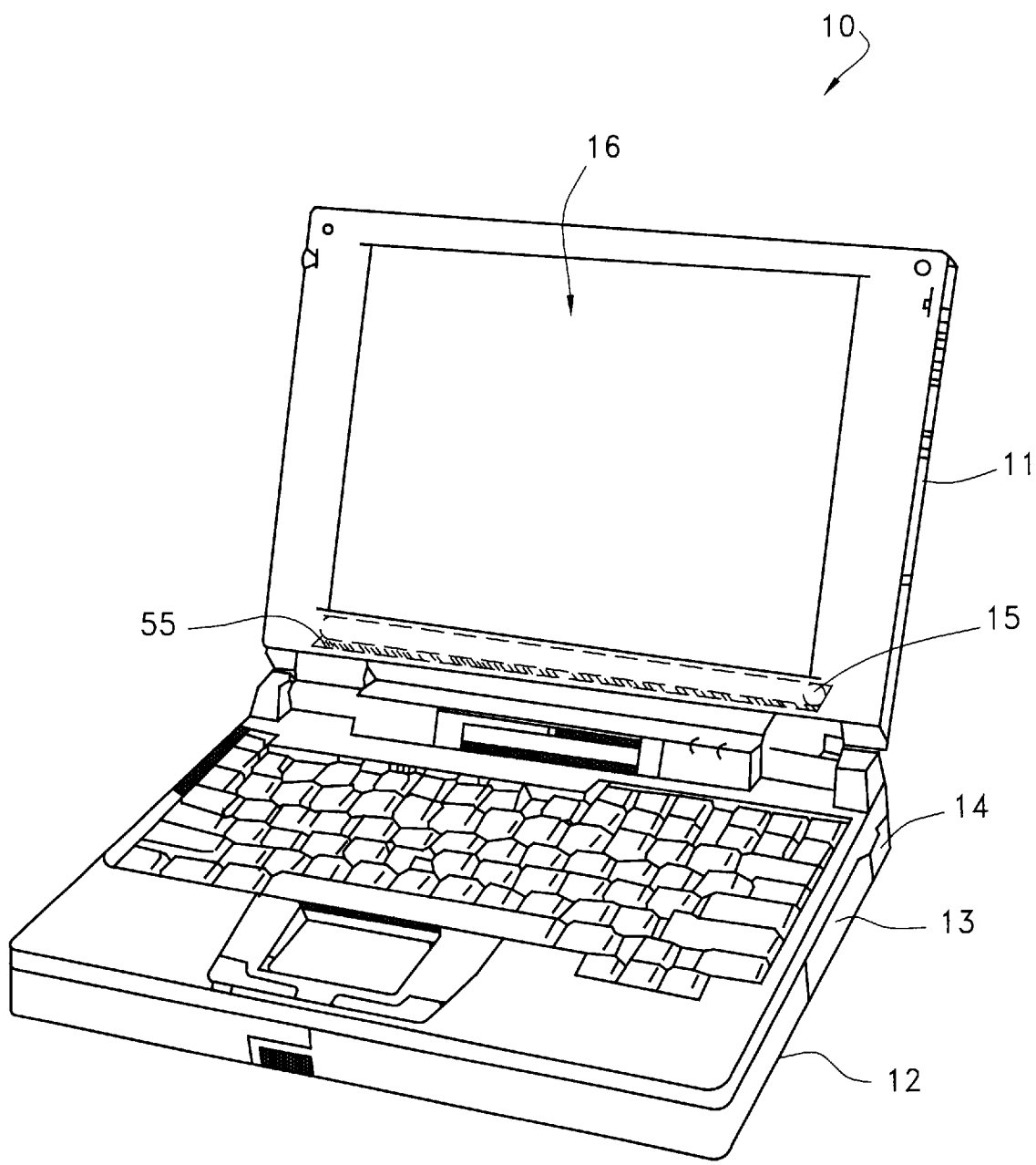
FIG. 1 is a drawing of a notebook computer showing an embodiment of the present invention.

FIG. 1 is a perspective view of a notebook computer 10, which includes a display panel 11 and a chassis 12. The chassis 12 includes a rechargeable battery 13 and an external power plug 14. The power plug 14 is the port into which a power cord connected to an external power source (e.g., an AC to DC transformer) is inserted. As is well known in the art, when connected to an external power source in this way, the rechargeable battery 13 is recharged as needed, and the computer 10 is also powered by the external source.

The display panel 11 includes a display screen 16 of some type, such as an LCD display screen, and also has mounted therein a light source 15 for delivering light to a lightpipe (not shown in FIG. 1) as is known in the art (e.g., U.S. Pat. No. 5,050,946, the specification of which is hereby incorporated by reference). The display panel 11 may in accordance with one embodiment of the present invention include an array of solar cells 55. (Although the term "solar" cells is used herein, it is understood to mean any photoelectric device that converts light into electricity, regardless of whether the light comes from the sun or from a lamp or other artificial source.) The solar cells may be amorphous thin film solar cells, and may be positioned in one of the ways described more fully below.

Figure 2:
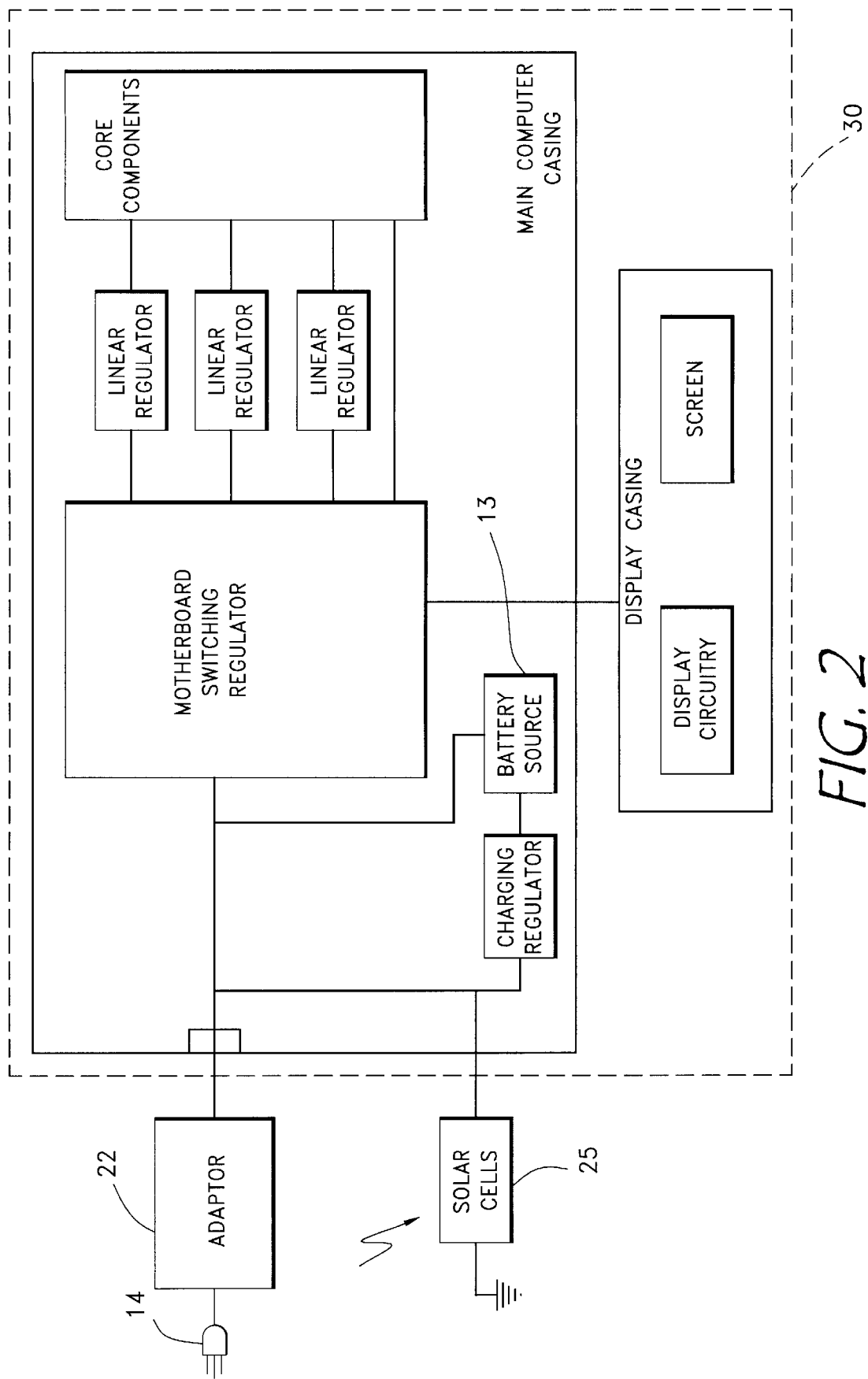
FIG. 2 is a block diagram of the sources of power in one embodiment of the present invention, where the battery can be powered by either an external source, or by solar power.

FIG. 2 is a block diagram of the electrical power system of the notebook computer of one embodiment of the present invention. As shown, the computer 30 (which typically includes a microprocessor as CPU, associated chipset, display screen, and other logic) is capable of receiving power from a number of sources. For example, when the plug 14 is connected to an external power source, the power converter 22 performs any power conversions that may be necessary, and the computer 30 is then powered by this external source. At the same time, the rechargeable battery 13 is also recharged (if necessary) by the external power source. And when the external power source is not available, the computer 30 is powered by the rechargeable battery 13. In one embodiment, these components may operate as described in U.S. Pat. No. 5,532,524, which is hereby fully incorporated by reference.

Also shown in FIG. 2 are solar cells 25. These solar cells 25 provide a direct current (DC) power source that is integrated into the electrical power system of FIG. 2. When the solar cells 25 receive light energy, this energy is converted into electric potential which may then be coupled to the other power sources and/or used in the electrical power system of FIG. 2. The electric potential from the solar cells 25 can be used to help recharge the DC battery 13, thereby prolonging the overall life of the rechargeable battery 13 before a full recharge is needed.

Figure 3:
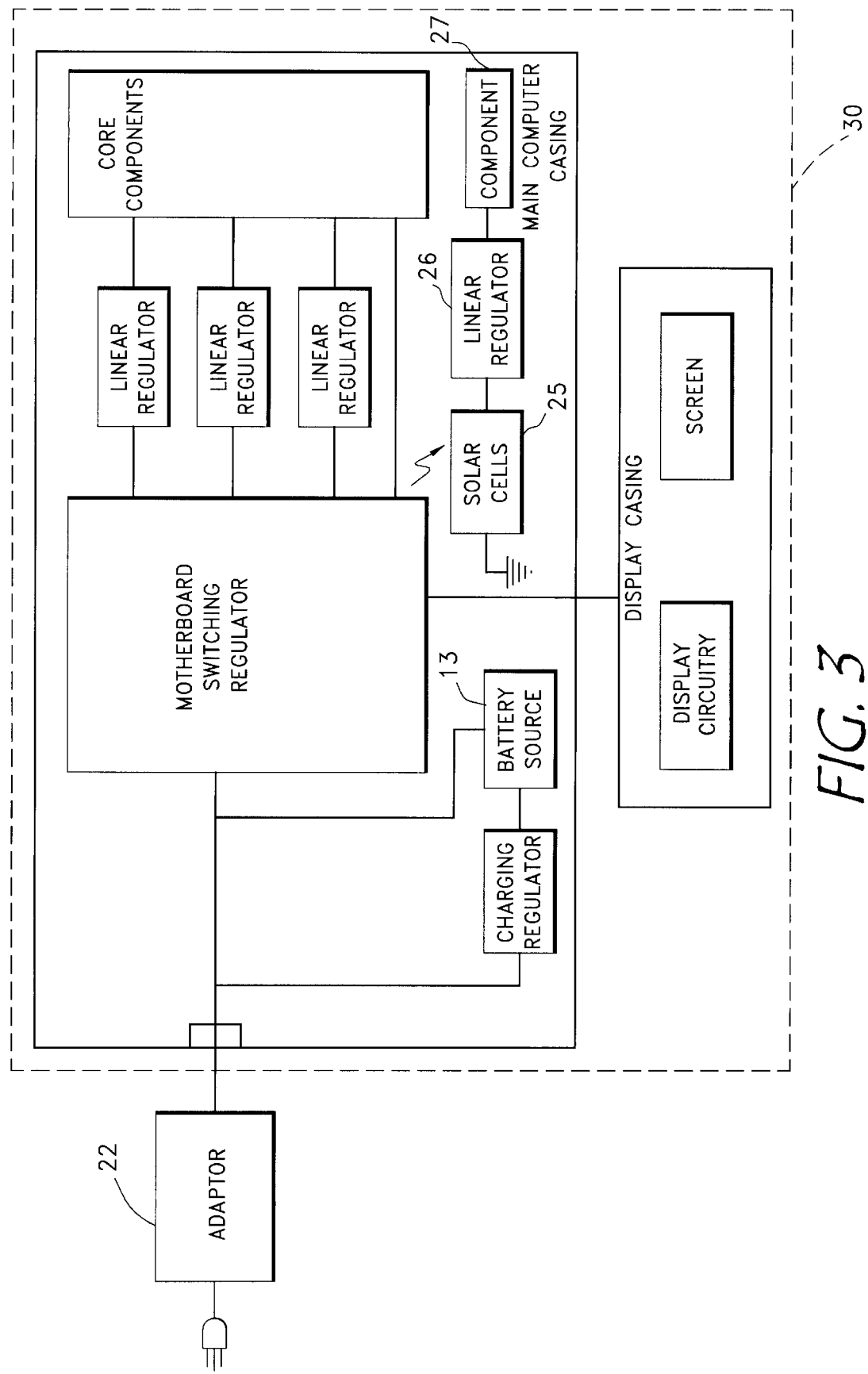
FIG. 3 is a block diagram of the sources of power in another embodiment of the present invention, where the solar cells are used to provide power to a specific component of the notebook computer.

In another embodiment of the present invention the electrical power system is configured so that the solar cells 25 are used to provide power to a particular portion of the notebook computer, such as one DC component (e.g., floppy disk drive) within the notebook computer 30, as shown in FIG. 3. In such an embodiment, the use of the solar cells 25 to supply power to one power-consuming component 27 of the notebook computer will ease the load on the rechargeable battery 13, thereby prolonging the life of battery 13. The rechargeable battery 13 can also be linked to the linear regulator 26 and used to supplement the power supplied by the solar cells 25 when the solar cells do not provide a sufficient amount of power to the component 27.

It is also possible to use the solar cells 25 to help supply power to an AC component, such as the backlight inverter for the display screen. Such an embodiment would be useful because the display screen is one of the largest consumers of power, and relieving the battery 13 of the burden of supplying power to the display screen (even partially) will significantly prolong battery life. However, using the solar cells 25 to supply additional or supplemental power to an AC component is not as efficient because of the energy lost converting the DC power from the solar cells 25 to the AC power required by such a component.

Figure 4:
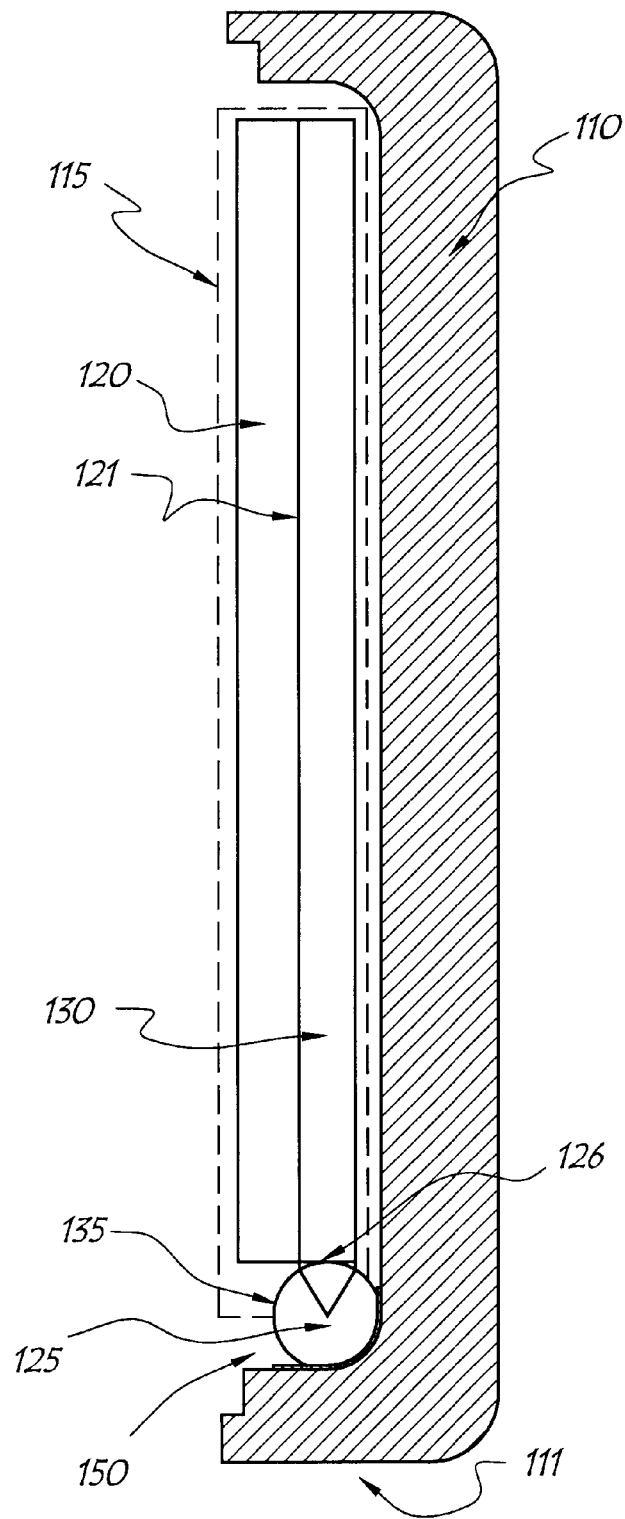
FIG. 4 is a cross-sectional view of a fliptop display screen of the notebook computer of FIG. 1 showing a light source with associated solar cells for supplying light to a lightpipe that illuminates an LCD display.

Referring now to FIG. 4, the LCD display screen 115 contained within housing 110 includes an LCD panel 120, a cylindrical light source 125 and a light pipe 130. The light source 125 extends across an elongated cavity 150 adjacent to the lower edge of display screen 115. The aperture 126 of the light source 125 is aligned adjacent to an edge of the light pipe 130. The light pipe 130 is immediately adjacent to the back surface 121 of the LCD panel 120.

Because conventional LCD's function like a light valve and even when "on" are not highly transmissive (monochrome LCD, approx. 12% transmissive; color LCD, approx. 2% transmissive) relatively large amounts of uniform light are necessary to illuminate the display. Thus, a relatively bright light source 125 is needed to provide backlighting. Unfortunately, significant amounts of light from light source 125 do not reach the screen viewer's eyes. Losses occur by absorption or reflection of light away from the desired direction in many places. For example, coupling of light at the aperture 126 into the edge of light pipe 130 is imperfect. Although the light source 125 may have a reflective layer or a surrounding reflector (not shown) this, too, is imperfect and light escapes through it or is misdirected by it. Some light sources 125 do not use a reflector at all, because it can complicate the difficult task of achieving approximately uniform light intensity at all points on the LCD panel 120. Finally, light that escapes through the LCD panel 120 that does not travel in the direction of the viewer's eye is not optimal.

As a result of these factors, the region around the light source 125 has significant light energy that is not effectively used in providing a screen display. It is often at least partially wasted, and thus represents an inefficient use of scarce battery power.

Figure 5:
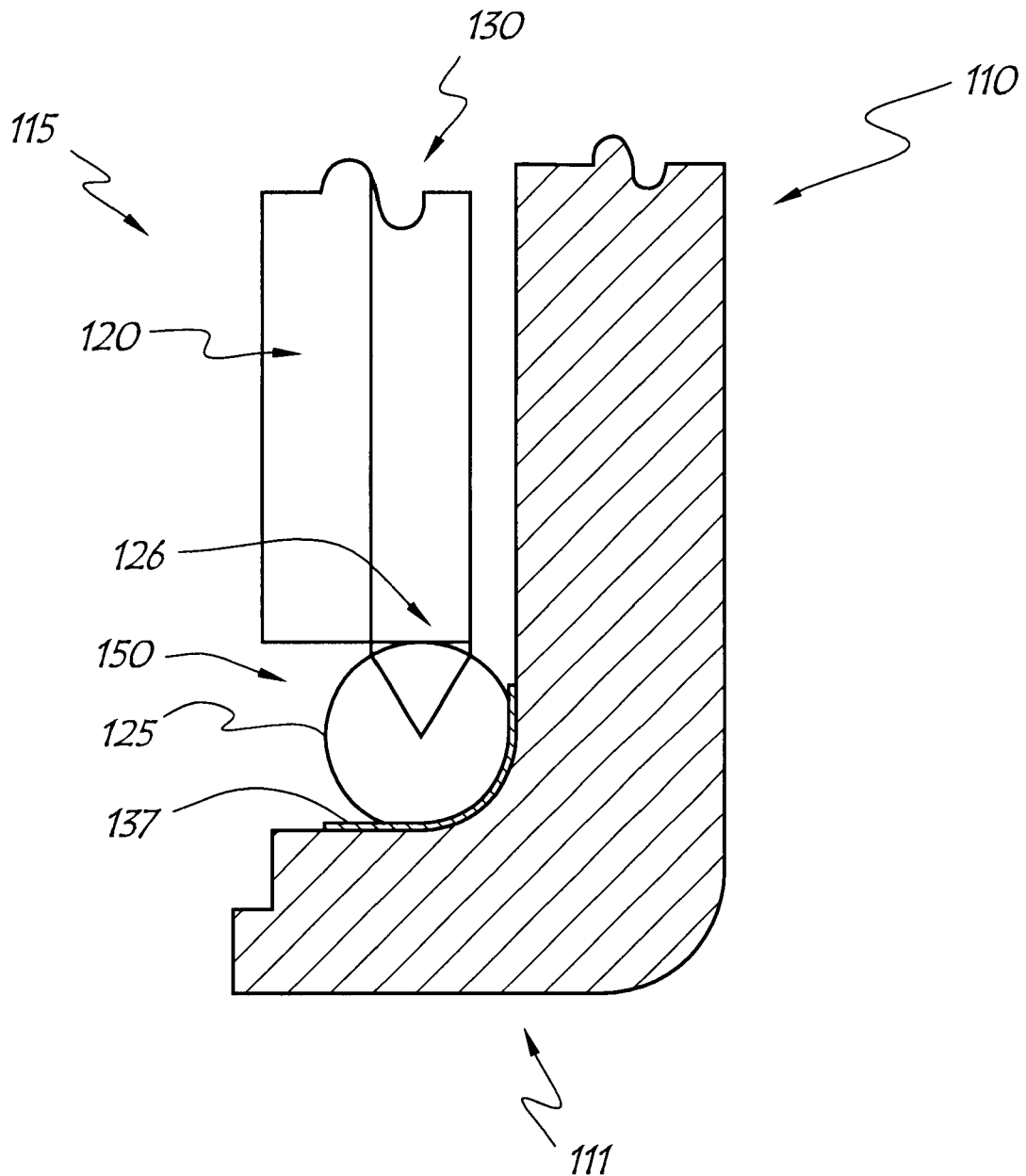
FIG. 5 is a modified close-up view of the lower portion of FIG. 4, showing the light source and an alternative embodiment of an associated array of solar cells.

To reduce this waste and prolong battery life, the present invention proposes capture of escaping and otherwise wasted light. In one embodiment, this is done by placing solar cells adjacent to the light source 125. As seen in FIG. 5, this can be done by surrounding the surface of light source 125, except for aperture 126, with a closely fitting, curved array of solar cells 135. This array allows the solar cells to be incorporated in the cavity 150 in an unobtrusive manner and so that the useful size of the display screen is not reduced. By placing the solar cells 135 closely adjacent to the surface from which otherwise wasted light escapes, this approach can be made effective. However, it may require a close fit of the solar cells 135 with the light source 125, which can be difficult or expensive to manufacture or assemble.

Figure 6:
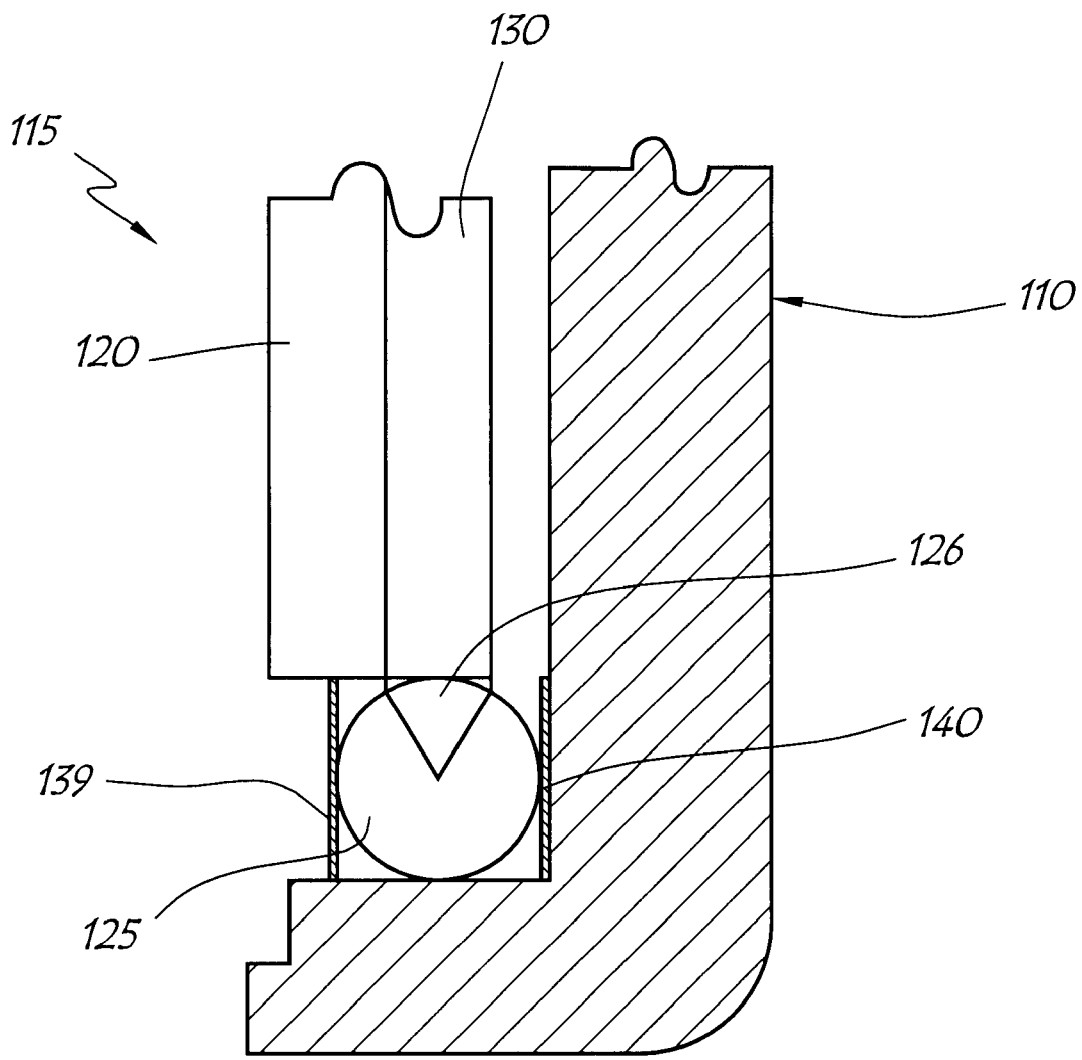
FIG. 6 is a modified close-up view of the lower portion of FIG. 4 showing a light source coupled to a lightpipe with planar arrays of solar cells positioned on either side of the light source.
Figure 7:
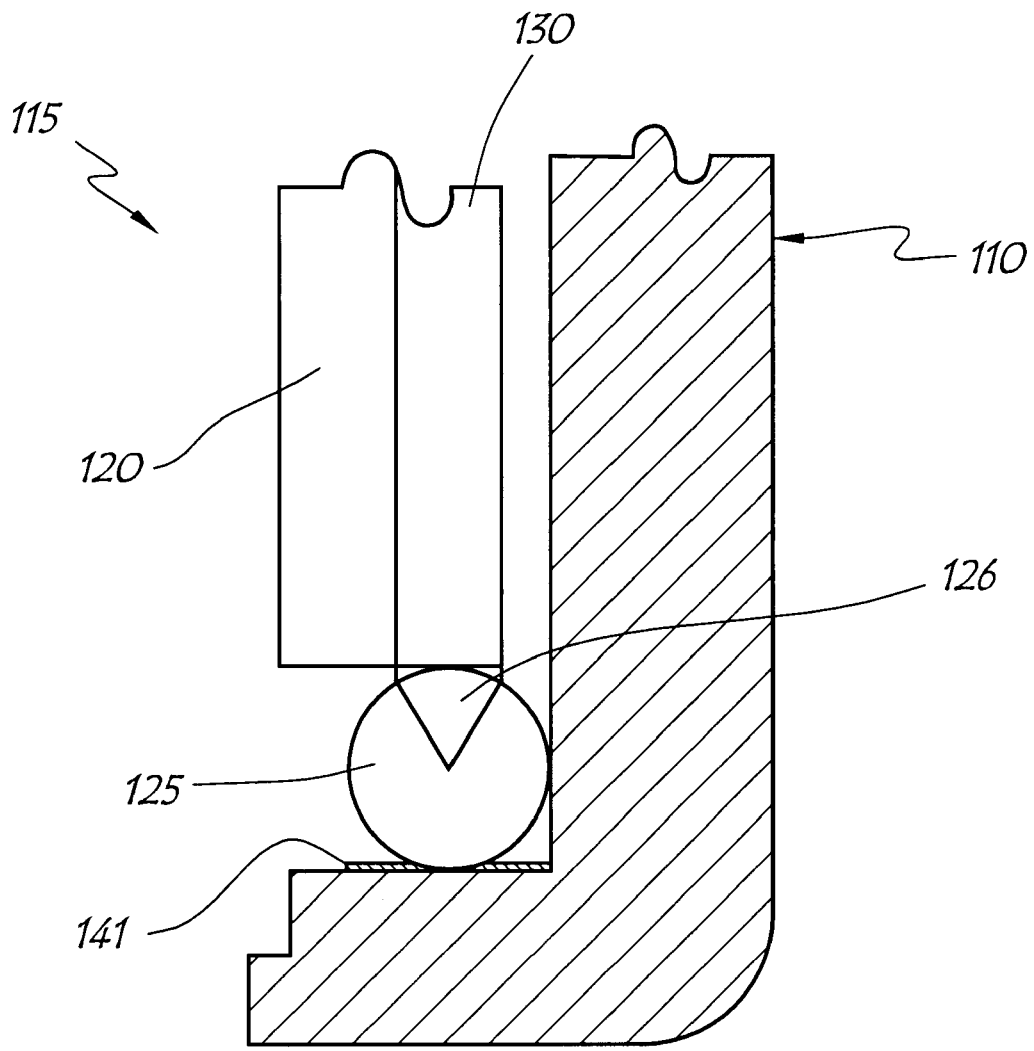
FIG. 7 is a modified close-up view of the lower portion of FIG. 5, with solar cells mounted on one side of the light source.

An alternative configuration appears in FIG. 5. Here, solar cells 137 are applied to the inner surface of housing 110 where it curves to form the lower side 111 of housing 110. Again, the shape required for the solar cells 137 to fit the inner housing surface may be difficult or expensive to manufacture. FIGS. 6 and 7 show two further alternative configurations that employ more commonly available planar arrays of solar cells. FIG. 6 shows a pair of planar solar cell arrays 139, 140 arranged to lie adjacent opposed sides of the light source 125. Neither array 139,140 affects aperture 126. FIG. 7 shows a single planar array 141 of solar cells placed opposite the aperture 126. It will be recognized that other configurations of such planar arrays are possible, including a pair of planar arrays joined at one edge with a 90% or other angle between them or three planar arrays joined to form a through shape to partially surround the light source 125.

Figure 8:
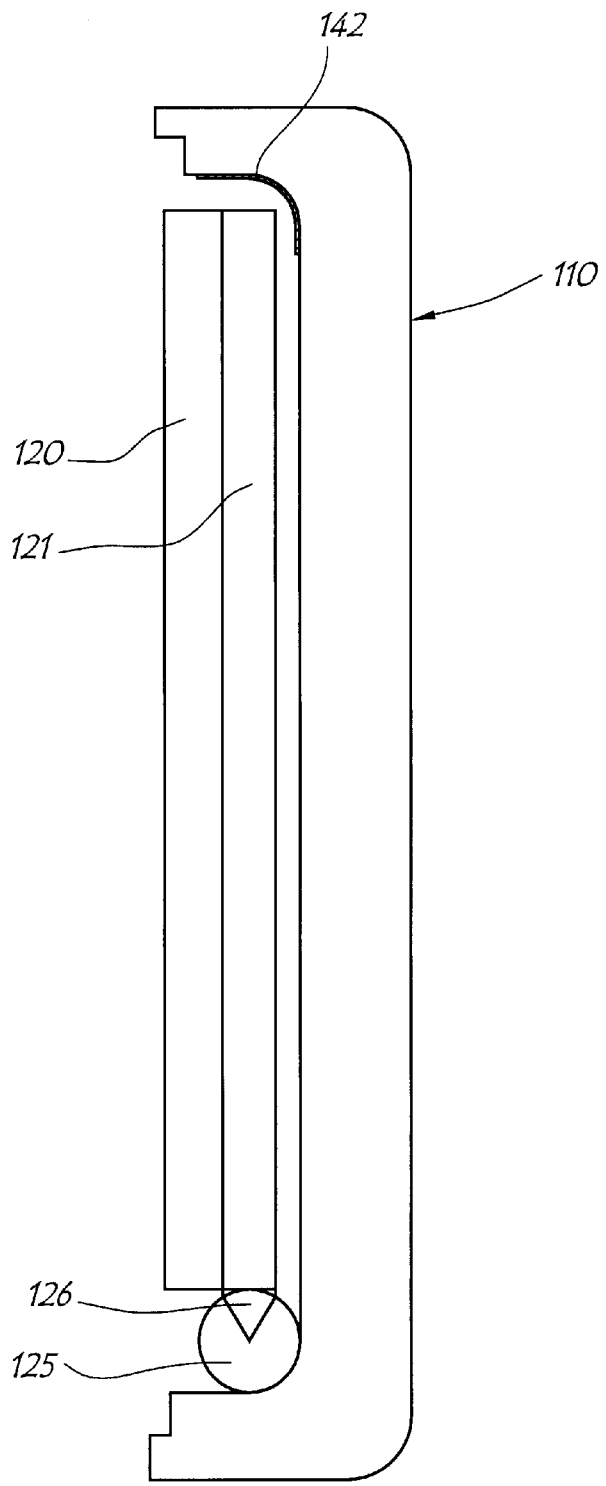
FIG. 8 is a cross-sectional view of a fliptop display screen of the notebook computer of FIG. 1 showing an array of solar cells positioned opposite the light pipe.

FIG. 8 shows yet another embodiment, where solar cells 142 are positioned on the side of the display screen opposite the lightpipe. In this embodiment, light that reaches the opposite side of the display screen is captured by solar cells 142. Although this light could be reflected back into the light pipe, in some situations this solution has drawbacks. For example, when the light is reflected back into the light pipe, the display intensity may not be uniform, thereby compromising display quality. For this reason, this light is often wasted, and not reflected back into the light pipe. By placing the solar cells 142 as shown in FIG. 8, this light can be used.

Among the benefits that may be associated with the present invention are: (1) additional battery life before the battery of a portable computer needs recharging; (2) recapture of light energy that would otherwise be wasted; and (3) provision of supplemental power to one component of a portable computer to help reduce battery load caused by that component.

Although the light sources shown in FIGS. 5–8 are cylindrical, it should be understood that light sources or backlights having a different construction and/or shape would also be capable of being effectively used in the present invention. In addition, although the present invention has been shown and described with respect to preferred embodiments, various changes and modifications that are obvious to a person skilled in the art to which the invention pertains, even if not shown or specifically described herein, are deemed to lie within the spirit and scope of the invention and the following claims.

What is claimed is:

1. A method of providing power in a portable computer which includes a display panel assembly having a display screen, the method comprising:

providing a light source for generating light within the display panel;

positioning the light source within the display panel to deliver light to and illuminate the display screen wherein, due to the positioning of the light source with respect to the display screen, not all of the light generated by the light source is delivered to the display screen, thereby resulting in wasted light;

providing a plurality of solar cells, wherein each of said solar cells has at least one surface that is configured to capture light; and positioning the plurality of solar cells within the display panel such that at least two of said solar cells lie in different planes from each other, with each of said at least two solar cells being positioned adjacent to the light source and with at least one light capturing surface substantially facing the light source so as to capture portions of the wasted light from the light source and convert the wasted light that is captured by the solar cells into electrical power.

2. The method of claim 1, wherein the act of positioning comprises disposing the at least two solar cells on portions of the surface of the light source.

3. The method of claim 1, wherein the act of positioning comprises disposing each of the at least two solar cells on a surface that is immediately adjacent the light source.

4. The method of claim 3, wherein the light source is cylindrical in shape.

5. The method of claim 1, wherein the light source has an aperture for delivering light to the display screen and wherein the act of positioning comprises:
   configuring the solar cells in at least two planar arrays; and
   positioning one of the at least two planar arrays of solar cells on the side of the light source opposite the aperture.

6. The method of claim 1 wherein the light source has an aperture for delivering light to the display screen and wherein the act of positioning comprises:
   configuring the solar cells in two planar arrays; and
   positioning the two planar arrays with one on either side of the aperture.

7. The method of claim 6, wherein the light source is cylindrical in shape.

8. The method of claim 1 wherein the solar cells are amorphous thin film solar cells.

9. The method of claim 1 wherein the light source has an aperture for delivering light to the display screen and wherein the act of positioning comprises disposing the solar cells on substantially the entire surface of the light source, except that portion defining said aperture.

10. A method of manufacturing a portable computer comprising:
   providing a chassis including a microprocessor powered by a rechargeable battery;
   rotatably connecting a display panel which includes a display screen to the chassis;
   disposing a light source, for generating light, within a cavity in the display panel so as to deliver light to and illuminate the display screen and the cavity in which the light source is mounted, wherein, due to the positioning of the light source with respect to the display screen, not all of the light generated by the light source is delivered to the display screen, resulting in wasted light;
   providing a plurality of solar cells, each of said solar cells having at least one surface that is configured to capture light; and
   disposing said solar cells within the display panel and in the cavity in which the light source is mounted such that at least two of said solar cells lie in different planes from each other and are each positioned adjacent to the light source with at least one light capturing surface substantially facing the light source so that at least two solar cells are each exposed to portions of the wasted light from the light source, so as to convert the wasted light to which the at least two solar cells are exposed into electrical energy.

11. The method of claim 10, further comprising:
   providing an interface that converts the light energy received by the solar cells from the light source into an electric potential usable in the computer.

12. The method of claim 11, further comprising:
   providing an electrical connector for connecting the electric potential to the display screen.

13. The method of claim 11, further comprising:
   providing an electrical connector for connecting the electric potential to a direct current component in the computer.

14. The method of claim 13, further comprising:
   providing a power source; and
   connecting the power source to the direct current component so that the power source supplements the power provided to the direct current component by the electric potential.

15. The method of claim 11, further comprising:
   providing a power source; and
   connecting the power source to the interface so that the electric potential may be used to recharge the power source.

16. The method of claim 15, wherein the act of providing a power source comprises providing a rechargeable battery.

17. The method of claim 11, further comprising:
   providing at least one power source; and
   connecting the at least one power source to the interface so that the electric potential is coupled to the at least one power source.

18. The method of claim 10, wherein the act of disposing comprises positioning the at least two solar cells on portions of the surface of the light source.

19. The method of claim 10, wherein the act of disposing comprises positioning each of the at least two solar cells on a surface that is immediately adjacent the light source.

20. The method of claim 19, wherein the light source is cylindrical in shape.

21. A display panel assembly for a portable computer comprising:
   a display screen;
   means, positioned within the display panel, for generating light within the display panel so as to deliver light to and illuminate the display screen wherein, due to the positioning of the means for generating light with respect to the display screen, not all of the light generated by the means for generating light is delivered to the display screen, thereby resulting in wasted light; and
   means for capturing light located within the display panel, said means for capturing light comprising a plurality of members wherein each of said members have at least one surface that is configured to capture light, at least two of said members lying in different planes from each other and each of said at least two members being positioned adjacent to the means for generating light with at least one light capturing surface substantially facing the means for generating light so as to capture portions of the wasted light from the means for generating light and convert the wasted light that is captured by the means for capturing light into electrical power.

22. The display panel assembly of claim 21, wherein the at least two members are disposed on portions of the surface of the means for generating light.

23. The display panel assembly of claim 21, wherein each of the at least two members is disposed on a surface that is immediately adjacent the means for generating light.

24. The display panel assembly of claim 23, wherein the means for generating light is cylindrical in shape.

25. The display panel assembly of claim 21, wherein the means for capturing light defines at least two planar arrays, the means for generating light has an aperture for delivering light to the display screen and one of the at least two planar arrays is positioned on the side of the means for generating light opposite the aperture.

26. The display panel assembly of claim 21 wherein the means for capturing light defines two planar arrays, the means for generating light has an aperture for delivering light to the display screen and the two planar arrays are positioned with one on either side of the aperture.

27. The display panel assembly of claim 26, wherein the means for generating light is cylindrical in shape.

28. The display panel assembly of claim 21 wherein the means for capturing light defines amorphous thin film solar cells.

29. The display panel of claim 21 wherein the means for capturing light is disposed on substantially the entire surface of the light source except for a portion of the surface of the light source which defines an aperture for delivering light to the display screen.

* * * * *

UNITED STATES PATENT AND TRADEMARK OFFICE
CERTIFICATE OF CORRECTION

PATENT NO.    : 6,445,376 B2
DATED         : September 3, 2002
INVENTOR(S)   : Sean T. Parrish It is certified that error appears in the above-identified patent and that said Letters Patent is hereby corrected as shown below:

<u>Title page,</u>
After the paragraph identifying the Inventor, and before the paragraph containing the Notice regarding the term of the patent please insert a new section for the Assignee, indicating -- [73] Assignee:      Micron Technology, Inc., Boise, ID --.

Signed and Sealed this

First Day of April, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,445,376 B2  Page 1 of 1
DATED : September 3, 2002
INVENTOR(S) : Sean T. Parrish It is certified that error appears in the above-identified patent and that said Letters Patent is hereby corrected as shown below:

<u>Column 1,</u>
Line 29, please change "modem" to read -- modern --.

Signed and Sealed this

Fourth Day of November, 2003

JAMES E. ROGAN
*Director of the United States Patent and Trademark Office*